Figure 1:
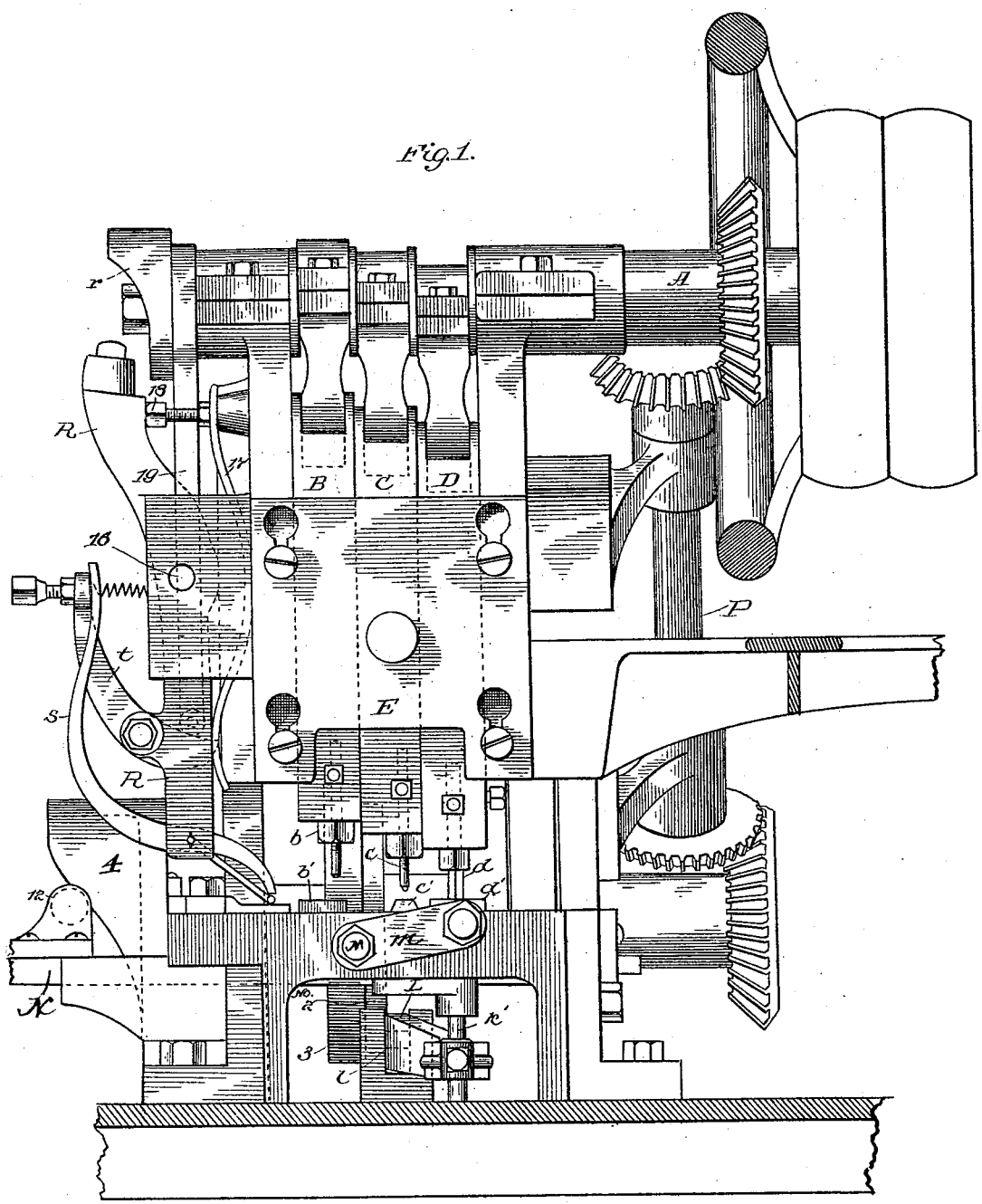

(No Model.)  5 Sheets—Sheet 1.
S. N. SMITH.
MACHINE FOR MAKING LACING HOOKS.

No. 272,787. Patented Feb. 20, 1883.

Attest:
Walter Donaldson
S. W. Lury

Inventor
Stephen N. Smith
by
Ellis Spear
Atty.

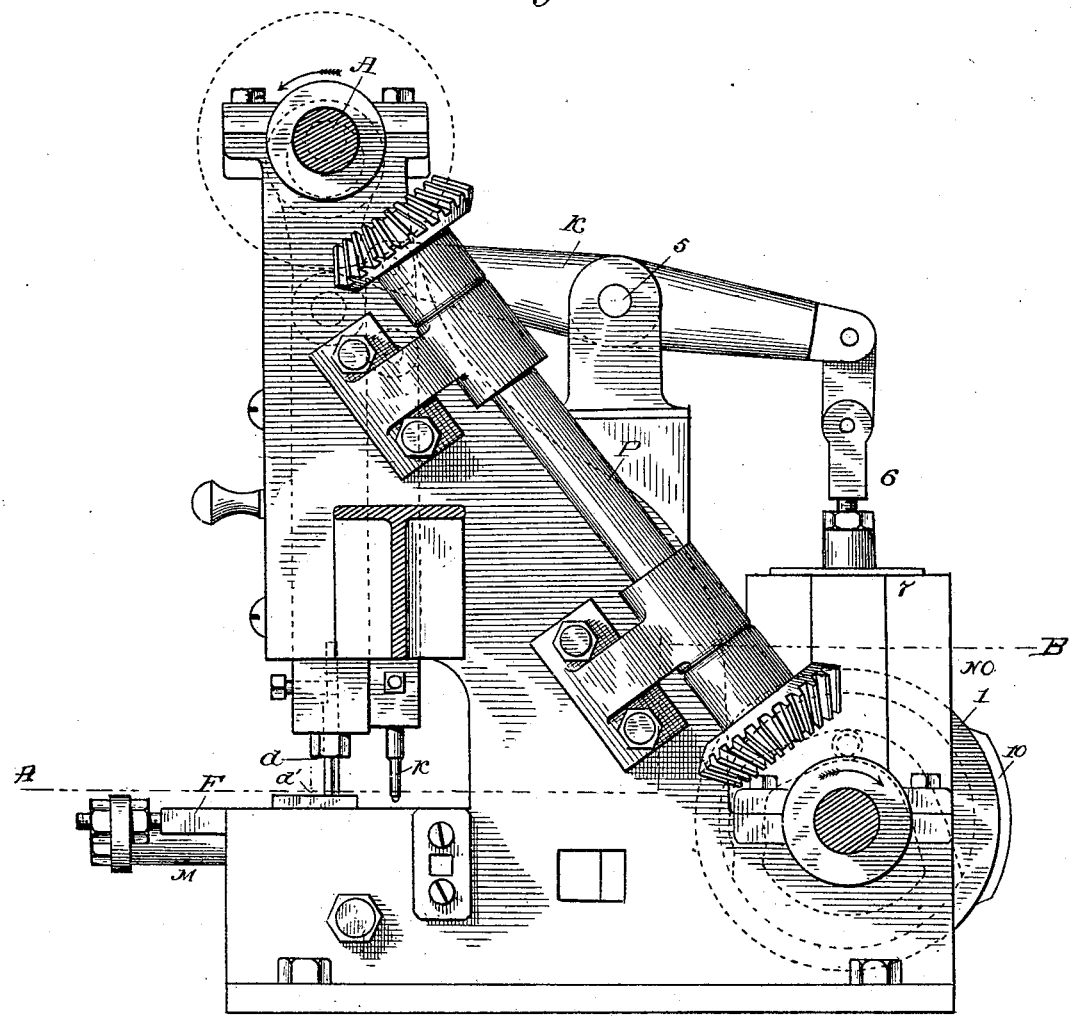

(No Model.) 5 Sheets—Sheet 3.
S. N. SMITH.
MACHINE FOR MAKING LACING HOOKS.
No. 272,787. Patented Feb. 20, 1883.
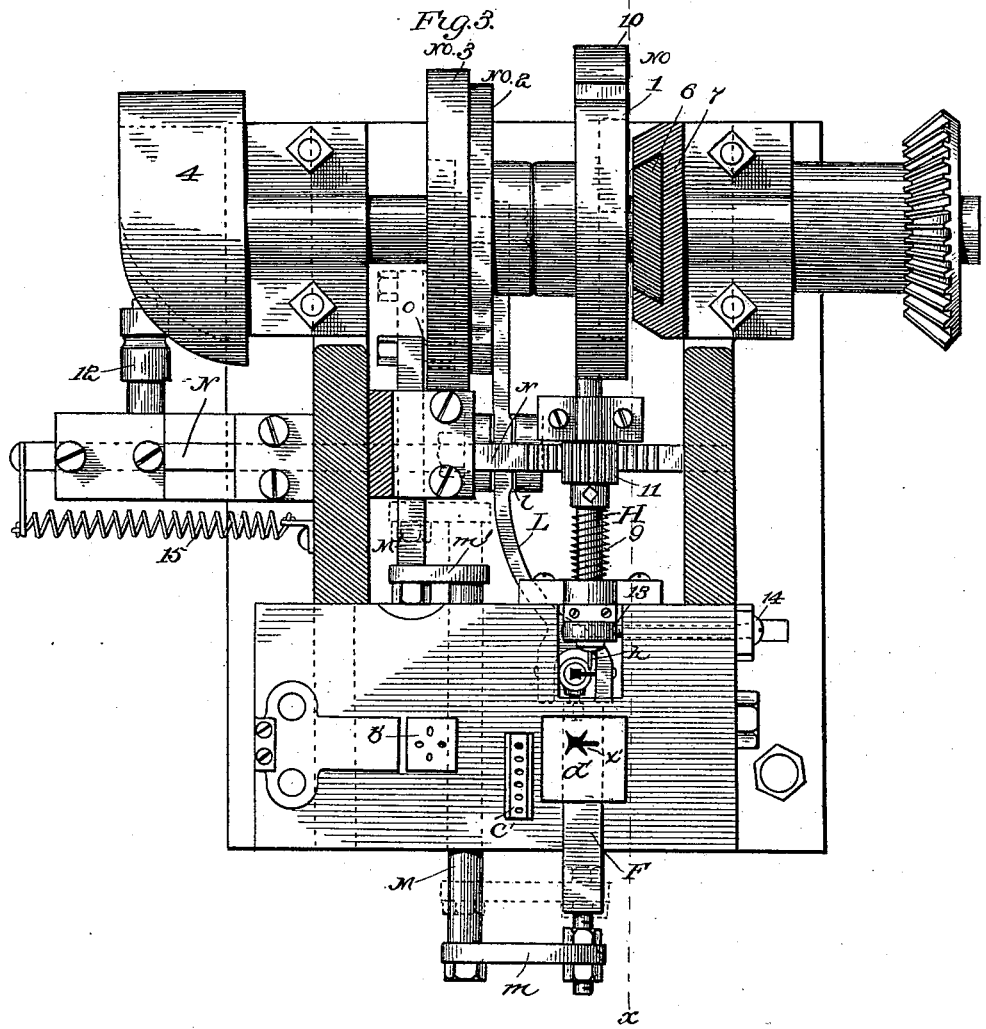

(No Model.) 5 Sheets—Sheet 4.
S. N. SMITH.
MACHINE FOR MAKING LACING HOOKS.
No. 272,787. Patented Feb. 20, 1883.
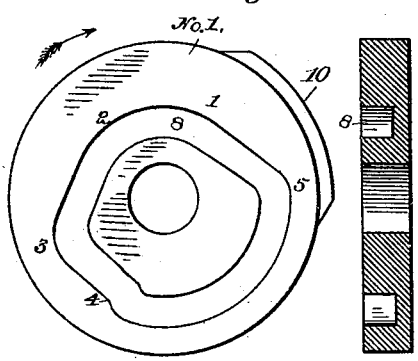
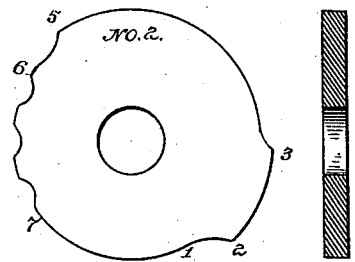
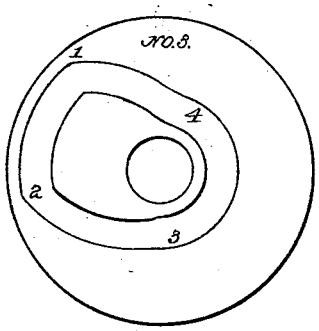
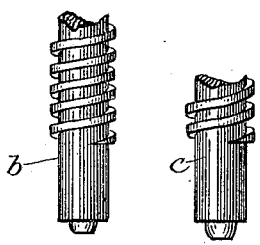
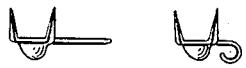
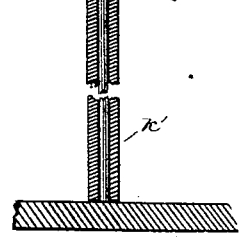
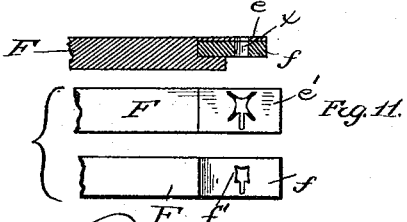
Attest:
Wallen Donaldson
S. W. Seely
Inventor
Stephen N. Smith
by Ellis Spear
Atty.

(No Model.)
S. N. SMITH.
MACHINE FOR MAKING LACING HOOKS.
No. 272,787. Patented Feb. 20, 1883.
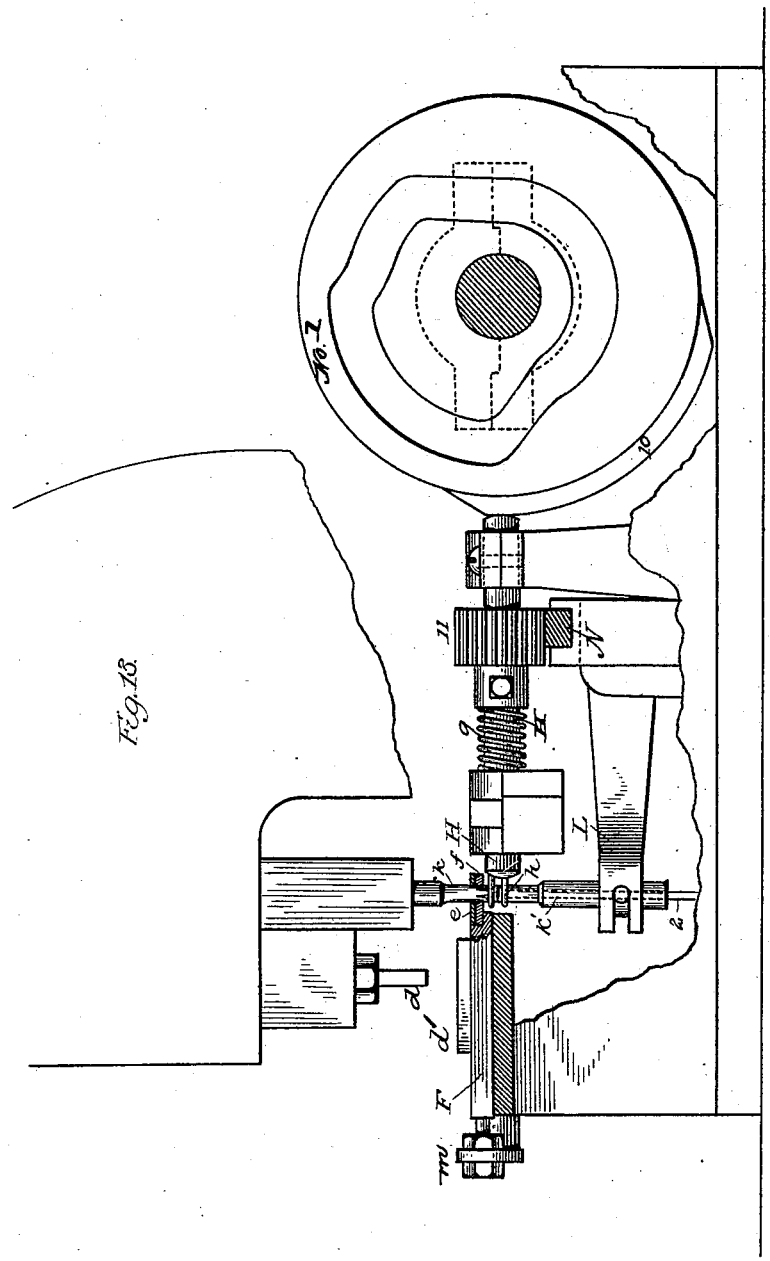
Attest:
Walter Donaldson
F. L. Middleton
Inventor
Stephen N. Smith
by Ellis Spear,
Atty.

UNITED STATES PATENT OFFICE.

STEPHEN N. SMITH, OF PROVIDENCE, RHODE ISLAND.

MACHINE FOR MAKING LACING-HOOKS.

SPECIFICATION forming part of Letters Patent No. 272,787, dated February 20, 1883.

Application filed May 29, 1882. (No model.)

*To all whom it may concern:*

Be it known that I, STEPHEN N. SMITH, of Providence, in the county of Providence and State of Rhode Island, have invented a new and useful Improvement in Machines for Making Lacing-Hooks; and I do hereby declare that the following is a full, clear, and exact description of the same.

My invention is an improved machine for making, out of thin sheet-metal, a special form of hook of that class adapted for use upon gloves, boots, and the like.

The hook made by this machine is of a form heretofore known, having prongs for attachment to the leather or fabric, a tongue bent to form the hook, and a dome upon the body of the hook or upon that part on which the prongs are formed, to prevent the dress of the wearer from accidentally catching in the hook.

The machine embodying my invention is provided with dies for drawing down and giving proper shape to the dome, a die for cutting the blank from the strip of sheet metal, a plunger for bending the prongs, mechanism for holding the blank while the hook is formed, and a rotating pronged hook-forming device, and with these, suitable feeding mechanism and a carrier for advancing the metal from one die to another; and in this general construction and arrangement of the parts my invention principally consists.

It further consists of improved mechanisms for giving suitable motion and position to the parts hereinbefore specified. These operating mechanisms may be varied without departing from the spirit of my invention, provided they are adapted to impart the proper motions in their proper order to the dies, feeding, carrying, and bending devices.

In the accompanying drawings, Figure 1 shows a front elevation, and Fig. 2 a side elevation. Fig. 3 is a plan view of a section taken on line A B, Fig. 2. Figs. 4, 5, and 6 illustrate the forms of the cams, and Figs. 7, 8, and 9 show details hereinafter explained. Figs. 10 and 11 are details of the carrier. Fig. 12 is a detail of the lower plunger. Fig. 13 is a section on line $x\,x$ of Fig. 3, partly in side elevation.

The main driving-shaft of the machine is represented at A, mounted in suitable bearings in the upper and front part of the frame. Connected to cranks on this shaft by suitable links are three plunger-stocks, B C D, which work in guideways behind a removable face-plate, E, and in the ends of these stocks are set the holders of the plungers $b\,c\,d$. (Shown in front elevation in Fig. 1.) The cranks are set upon the shaft so as to cause these plungers to work in proper order, beginning with the first named. Underneath these plungers are arranged dies corresponding thereto. The first (marked $b'$, shown in front view, Fig. 1, and in plan in Fig. 3) is underneath the first plunger. The depressions in the dies are formed to correspond with the ends of the plungers, being slightly elongated or semi-oval concavities. The second die, $c'$, under the plunger $c$, has a similar concavity, but slightly deeper, so that the metal is drawn down to form the dome of the hook by two successive steps. The dies are formed, as shown in plan view of Fig. 3, with a number of holes arranged so that the dies may be shifted to bring any one of the holes into alignment with the plunger when others have become worn. The first and second dies are fixed in position, and the strip of metal is simply fed over them step by step. The third die (indicated at $d'$ in plan view, Fig. 3) is clamped firmly to the bed directly under the third plunger and over a carrier moving horizontally from front to rear. This carrier is shown at F, and is adapted to reciprocate from front to rear by mechanism hereinafter described, so as to carry the blank from the cutting-die $d'$ to the back or forming die, just in rear of the cutting-die. Underneath the die and fixed to the carrrier is a thin steel plate, $e$, with an opening the same as in the cutting-die, and just thick enough to catch the blank and carry it forward, and below that a block, $f$. The form of the opening in the block or piece $f$ corresponds to the form of the blank, except that the prong cavities are shortened, as hereinafter explained, and as shown at $f'$, Fig. 11, so that when the blank is forced into this piece $f$ the prongs are turned up and lie vertically in the shortened cavities or grooves. The strip of metal, after leaving the second die, $c'$, is moved forward so as to bring the dome accurately over the opening $x'$ of the cutting-die $d'$. When the cutting-plunger descends it cuts the blank and forces it down into the cavity $x$ and then immediately leaves it. Within this cavity, as soon as it is left by the cutting-plunger d, it is carried to the rear and brought directly underneath the upper clamping-plunger, k. This plunger descends as soon as the die is in place, and forces the blank down through the steel plate e and into the piece f with the effect heretofore explained. The clamping-plunger k is formed at the end with a boss, and is in cross-section in oval shape, corresponding in general form to that of the dome, and as it forces the blank down through the steel plate it turns up the prongs, which are forced into the small grooves in the corners, where they are accurately formed in position at right angles to the plane of the blank. The upper plunger, k, does not descend immediately to eject the blank from the cavity x, but is met by a lower plunger, k', which rises to meet the blank and clamps the blank between itself and the upper plunger. The end of the lower plunger is formed with a concavity to fit the dome, thus clamping and holding the blank securely in position. Both plungers then sink so as to remove the blank from the die to bring the shank of the blank opposite the turning device which forms the shank into a hook. It is in position then as shown in Fig. 13. This turning device consists of two horizontal prongs formed of small round rods of steel, (marked h h, Fig. 9.) They are set in the end of a horizontal shaft, H. This shaft has rotary motion (a little more than a half-turn) and also reciprocates longitudinally. It is back at its rear limit, as shown in Fig. 3, when the clamping-plungers sink with the blank between their ends. When in this position the prongs rest one directly above the other, and the lower limit of this movement of the clamping-plungers brings the shank directly across in a horizontal plane with the opening between the prongs. The prongs then move forward to inclose the shank and receive a little more than a half-turn to the right, which turns the shank into the form shown on the right hand of Fig. 8. This movement beyond the half-turn of the prongs brings the end of the shank slightly downward or inward, so as to give greater security against catching accidentally into the dress of the wearer. Immediately upon the completion of this movement of rotation the shaft H moves backward to draw the prongs clear from the hook. The clamping-plungers then recede from each other to release the hook, now fully formed.

In order to more certainly discharge the hook and prevent any possibility of the hook sticking to the end of the lower plunger, I form the lower plunger with a longitudinal central bore in which is set a pin, 2. This pin is fixed in the lower part of the frame, and when the plunger k' reaches its lowest limit, after releasing the hook, the pin is projected from the upper end and pushes the hook from its seat, whence it may drop into any convenient chute.

I have thus described the construction and operation of the parts immediately operating to form the hook. I now proceed to describe the mechanism for imparting the proper motion to these parts.

The mechanism for operating the plungers b, c, and d has already been described. The rear plunger, k, is operated by the lever K. (Shown in the side elevation, Fig. 2.) This lever is pivoted on a standard at 5, and is connected, as shown in dotted lines in said figure, to the upper end of the stock of the rear plunger, k. The rear end is connected by a link to a vertically-sliding bar, 6, moving in a guiding-groove in a standard, 7, on the main frame. The lower end of the bar 6 is provided with a pin and truck-roll, which work in a cam-groove in the face of cam-wheel No. 1, Figs. 3 and 4. The movements of the clamping-plungers are necessarily more complex than that of the plungers b, c, and d, which simply descend, perform their offices, and then rise, whereas of the clamping-plungers varied movements are required, as hereinbefore explained. The upper plunger, k, receives its special movements through the special form of the groove 8 in the right-hand face of the wheel No. 1, as represented in Fig. 4. On the face of wheel 1, as shown in said figure, the groove is represented as lowest at point marked 1. When the truck-roll of the bar that works the plunger k is at this point said plunger is raised. The motion of the wheel in the direction of the arrow advances the roll to point 2, during which time the carrier is placing the blank under plunger k. From 2 to 3 the plunger is brought down to bend the prongs. At that point the curve causes the plunger to remain stationary until the motion of the wheel brings the point 4 to the roll. This occurs while the lower plunger is rising to clamp the blank. After this the curve moves outward from point 4, which pushes the plunger out of the cavity x and holds the blank opposite the twisters, as heretofore explained. During this time the truck-roll is moving over part of a true circle to the point 5, from which point the groove descends at an angle adapted to raise the plunger to its upper limit of movement. The lower plunger, k', is operated by a lever, L, placed underneath. It is pivoted at l, and has a pronged front end in which the stock or carrier of the plunger is pivoted. The rear end of the lever L extends under the cam-wheel No. 2, and is held in contact with the edge thereof by a suitable spring. The face of this wheel between 7 and 1 is adapted to leave the lower plunger at its lowest limit. From 1 to 2 it rises, lifting the plunger to meet the blank and clamp it in cavity x. This position continues from 2 to 3, when it falls off, this happening at the same time when the truck-roll of lever K is moving from part 4 on wheel No. 1, and the two movements carry both plungers down together. At point 5 on cam-wheel No. 2 the cam falls off still farther, causing the lower plunger to sink down and release the hook. The succession of notches from 6 to 7 give rapid oscillations to the lever L and insures the removal of the hook.

Cam-wheel No. 3 operates the carriage F. This is connected by means adjusting-screws to a yoke, *m*, which is carried on the end of a rod, M, sliding in the bed-plate, said rod being attached to another rod, M', by a similar yoke, *m'*. A truck-roll, *o*, on rod M', working in the cam-groove of wheel No. 3, moves these rods and carriage. The roll, moving in the groove, gives reciprocating movement to the carriage. While the roll is passing from 1 to 2 the carriage is at rest in position to receive the blank, and from 3 to 4 it is in its rear position long enough to allow the dies to press up the prongs, and the prongs *h h* to bend up the shank. The cam-wheels move as indicated by the arrows in Fig. 4. The two motions of the hook-forming prongs *h h* are imparted by cam-wheel No. 1 and cam No. 4 on the extreme end of the shaft. The shaft H, which carries the prongs *h h*, bears against the periphery of the wheel No. 1, being kept in contact therewith by spring 9. This wheel has on its periphery a high part, 10, arranged in such position that it will strike the end of rod H, and force it forward immediately after the plungers have brought the blank opposite the opening between the prongs. The high part is long enough to hold the prongs forward while they are turning. When it has passed the end of the shaft H the spring throws the rod or shaft back. Rotary motion is imparted to the shaft by means of a pinion made fast thereon meshing into a rack-bar, 11, attached to a slide, N, the pinion being long enough to allow the necessary motion without getting out of gear. The slide N carries a pin, 12, bearing against the cam No. 4, whereby proper movement is imparted to the rack-bar. The shaft H is supported at its forward end in a movable bearing, 13, adapted to be laterally adjusted by means of a screw, 14, the head of which is provided with a collar to hold the screw from longitudinal movement. The purpose of this is to accurately adjust the position of the bending-prongs and regulate the space between the end of the hook part of the shank and the dome. The slide is returned by a spring, 15.

The mechanism for feeding the strip is shown in Fig. 1, and is the same as that shown in Patent No. 259,229, granted me on the 6th day of June, 1882. A main lever, R, pivoted at 16, is moved by a cam, *r*, on the upper shaft to feed positively, and is returned by a spring, 17. It is regulated as to amount of throw by set-screw 18. A lever, *s*, having a spring-arm is pivoted in the lower end of lever R, the gripping end of which bears on a bent rod pivoted also in the lower end of the lever R. The arm of this lever-rod lies across the path of and underneath the strip, which is pinched thereon by end of lever *s*. A supplemental lever, *t*, pivoted on R, is worked by a bar, 19, to cause the lever to grip at the proper moment. This construction of the feeding-lever is such, and the movement of the parts is so timed in relation to the other parts of the machine, that it grips the strip and moves it forward into proper position under the first die just before the plunger of that die descends. It immediately releases its grip upon the strip before the plunger has quite completed its movement, thus allowing the strip to move as the dome is drawn down, and preventing any rupture of the metal. The feed-lever immediately returns and again grips the strip and pushes it forward in the same manner to bring the dome to the second die, where the metal is further drawn down by the second plunger and the dome completed, while the first plunger is operating on a fresh part of the strip. The feeding-lever returns again and pushes the strip a third time to the third or movable die, by means of which, when the blank is cut out therein, it is carried to the rear, as hereinbefore explained. Motion is communicated to the lower rear shaft, which operates the cams, by means of the shaft P and bevel-gears, as shown in Fig. 1. The strip of metal is fed over a plate on the left-hand side of the first die, as shown in Figs. 1 and 3.

Having thus described my invention, what I claim is—

1. The combination, in a machine for making lacing-hooks, of mechanism for feeding the strip of metal, a plunger or plungers for forming the dome, and corresponding die or dies arranged to operate on the strip before it is cut, a cutting-die and plunger, a carrier having a cavity adapted to receive the blank, and placed next after the dome-forming devices to remove it to the prong-bending mechanism, a plunger adapted to act in connection with the cavity of the carrier to bend the prongs, holding mechanisms, bending mechanism for forming the hook, and devices, substantially as described, for operating the parts specified, all substantially as set forth.

2. In a machine for forming lacing-hooks, a prong-bending mechanism consisting of an upper and lower plunger, the movable carrier having opening with slots to receive the extended prongs of the blank, and a block below to bend up the prongs, in combination with mechanism, substantially as described, for causing the plungers to clamp the blank after the prongs are bent, to move together, to remove it from the die, and to hold it in position for bending the shank, as set forth.

3. In a machine for forming lacing-hooks, and in combination with the described plungers for holding the blank, a pronged shaft adapted to embrace and bend the tang of the blank, and mechanism for giving rotary and longitudinal motion to the same, all substantially as described.

4. In combination with the shaft H, carrying prongs *h h*, adapted to operate as described, and with the described holding devices, the movable bearing 13, and the adjusting-screw 14, as set forth.

5. The combination of the described devices for holding the blank with the shaft H, carrying prongs h h, the cam-wheel No. 1, the pinions fast on the shaft H, the rack-bar, and the cam No. 4, all substantially as described.

6. The combination, with the carrier F, of the die d, the block f, and the interposed steel plate, said parts being provided with a specially-shaped cavity, x, and operating in connection with the described plungers, all as set forth.

7. The lower plunger, k', having a central bore, and a fixed pin, in combination with the die, upper plunger, k, the lever L, and the cam-wheel No. 2, whereby the blank is gripped and subsequently removed, all as set forth.

In testimony whereof I have signed my name to this specification in the presence of two subscribing witnesses.

STEPHEN N. SMITH.

Witnesses:
GILMAN E. JOPP,
JOHN C. BURKIS.